Aug. 4, 1931.  A. E. YOUNG  1,816,950
MEASURING APPARATUS
Filed April 13, 1929  3 Sheets—Sheet 1
Fig. I.
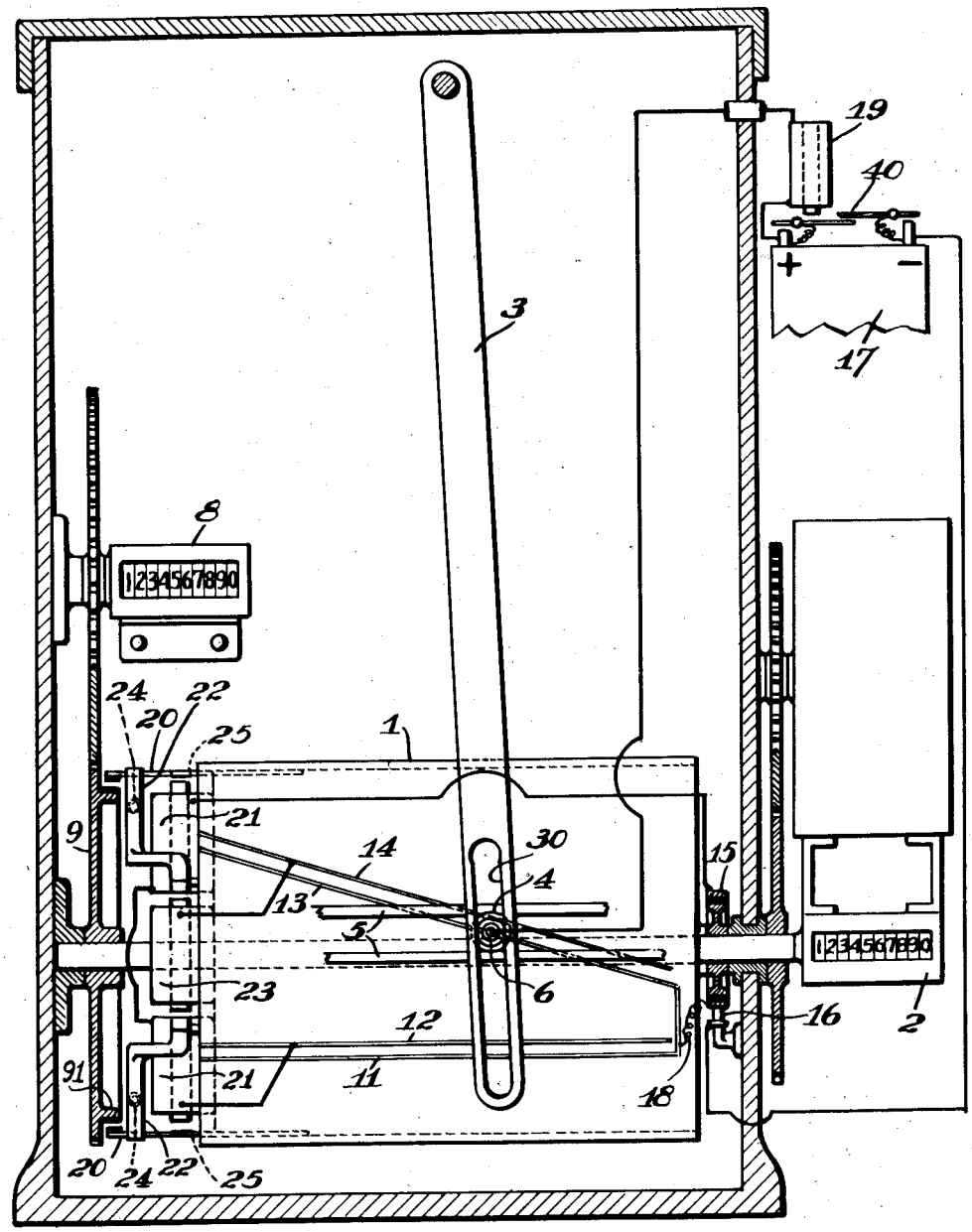

Aug. 4, 1931. A. E. YOUNG 1,816,950
MEASURING APPARATUS
Filed April 13, 1929 3 Sheets-Sheet 2
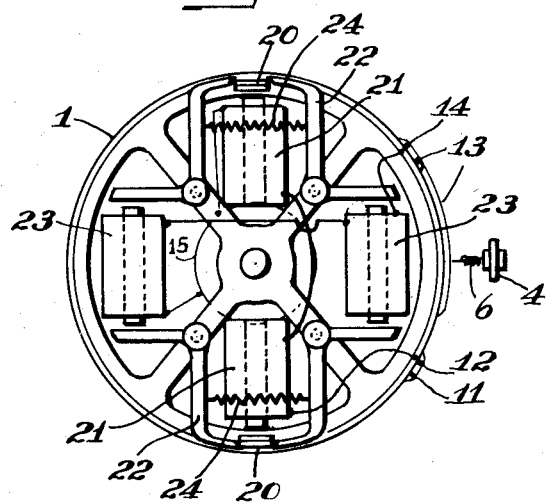
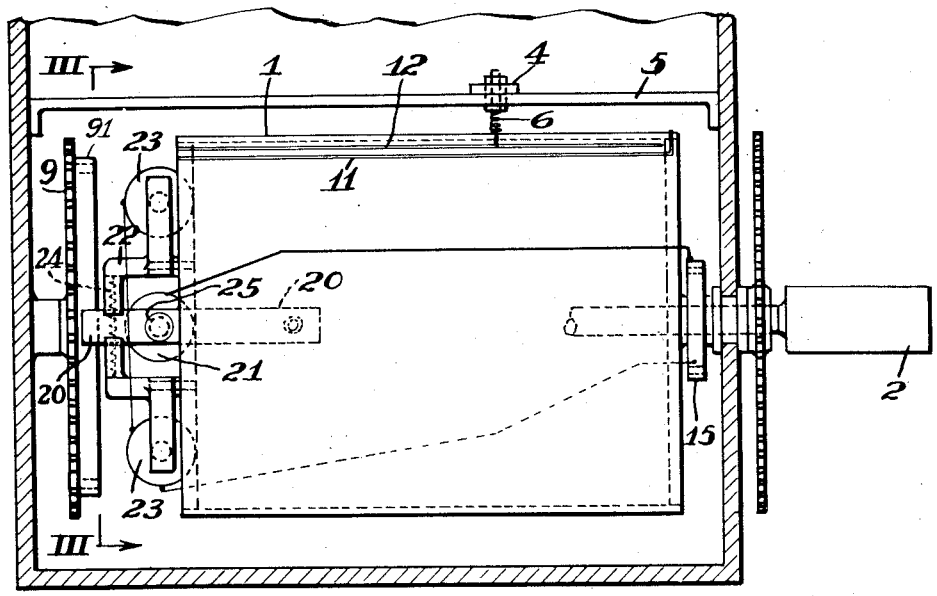

Aug. 4, 1931.  A. E. YOUNG  1,816,950
MEASURING APPARATUS
Filed April 13, 1929   3 Sheets-Sheet 3
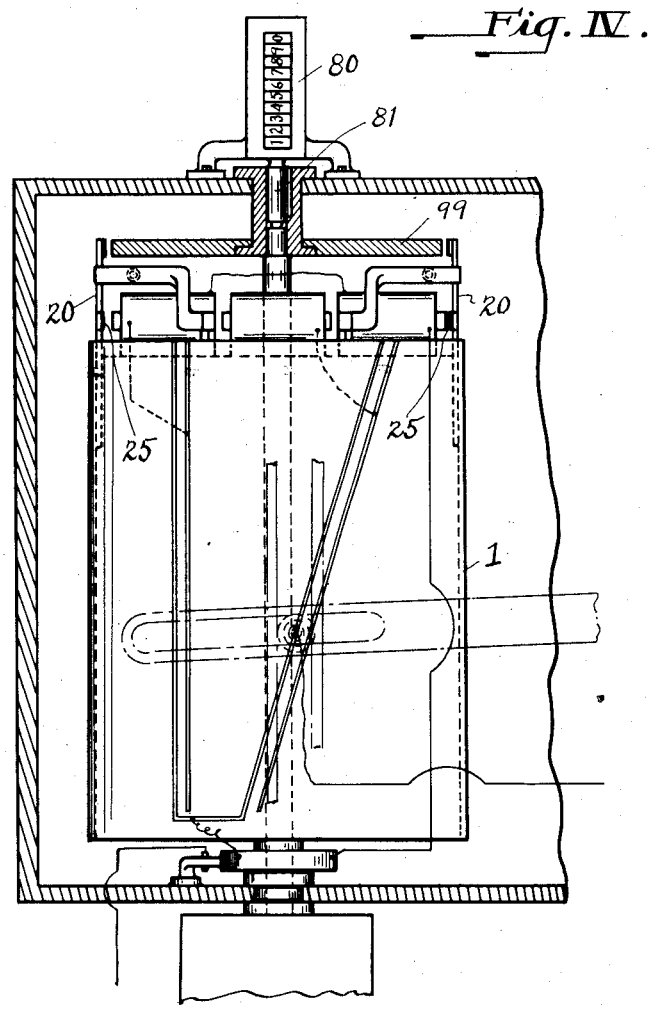
Fig. IV.
INVENTOR
Archer E. Young
by Christy Christy and Wharton
his attorney Patented Aug. 4, 1931

1,816,950

UNITED STATES PATENT OFFICE

ARCHER E. YOUNG, OF PITTSBURGH, PENNSYLVANIA

MEASURING APPARATUS

Application filed April 13, 1929. Serial No. 354,861.

My invention relates to apparatus for aggregating through prolonged intervals of time the value of a variable. I shall show and describe the invention in application to the measurement of gas, and then indicate its wider applicability.

In the accompanying drawings Fig. I is a view, partly in elevation, partly in vertical section of an installation of gas-measuring apparatus built and operated according to my invention; Fig. II is a view of the same apparatus, partly in plan, partly in horizontal section; Fig. III is a view in end elevation of a portion of the apparatus of Figs. I and II. Fig. IV is a fragmentary view, corresponding to Fig. I, and illustrating certain alternative details of structure.

A cylinder 1 mounted for rotation may by known instrumentalities be caused to rotate in synchronism with a positive meter—a meter, that is to say, which makes direct volumetric measurement of gas in advance from a place of supply to a place of consumption. In such case, each revolution of the cylinder will be indicative of the advance of a given volume of gas. The cylinder may be geared directly to a tally 2, and the apparatus may be so adjusted that the tally shall afford direct reading of the cubic feet of gas passed by the meter.

In the arrangement thus far described no provision is made for variability in the density of the gas measured; and, while I find it desirable to include in my apparatus the means described for the direct volumetric measurement of gas, I associate with these other means of measurement, in which correction is made for variability in the pressure and correspondingly in the density of the gas measured.

A pivoted arm 3 of relatively great length may by known instrumentalities be caused to swing in response to variation in the pressure of the gas as it is measured, so that the particular position of the arm 3 will always be indicative of the extant condition of pressure. A block 4 movable along suitable ways 5 in a course parallel with and adjacent to the surface of cylinder 1 may be movable along a slot 30 in crank arm 3 also, to the end that the particular position of block 4 along the face of a cylinder 1 shall be indicative of the extant condition of the pressure of the gas being measured.

Block 4 carries insulated within a bore through it a conductor which ends in an elastic terminal or brush 6, and this brush bears upon the surface of cylinder 1.

The surface of cylinder 1, formed otherwise of insulating material, carries two pairs of strips of conducting material. The strips of each pair lie in parallelism, or substantially so, spaced apart by insulation. One pair of strips, 11 and 12, when in place on the cylinder may conveniently be made to extend longitudinally, in parallelism with the cylinder axis; the other pair 13, 14, will then extend obliquely, and this second pair will be so particularly shaped and disposed that the interval measured circumferentially from the second strip 12 of the first pair to the second strip 14 of the second pair will vary from point to point longitudinally of the cylinder; and as the cylinder rotates the range of angular turning between the successive contacts of the brush 6 first with strip 12 and then with strip 14 will be of greater or less extent, according to the position of block 4 along ways 5. The strips 12 and 14 will be minutely shaped and relatively disposed upon the surface of cylinder 1 to afford a range of angular turning between such successive contacts which shall bear a predetermined relationship to the position of the block 4 along the ways 5. In the case in hand, it may be understood that as the pressure increases block 4 will move along ways 5 from right to left (Fig. I), and as the block so moves to the left the range of angular turning of cylinder 1 between the succeeding contacts of brush 6, first with strip 12 and then with strip 14 will be enlarged. The strips may be so relatively positioned as to afford correction for variation in the condition of pressure under which the gas is measured, in accord with Boyle's law. Indeed, more accurate correction may be made than computation under Boyle's law can afford; for as pressure increases an appreciable factor of inaccuracy appears in computation under Boyle's law, and by modification in the particular relative placement of the two strips 12 and 14 that factor of inaccuracy may be eliminated.

In consequence of the successive contacts of brush 6 with strips 11 and 12 means will be effective for causing the cylinder 1 as it turns to drive a tally meter 8, and in consequence of the ensuing successive contacts of brush 6 with strips 13 and 14 the means last alluded to will be rendered ineffective and the further turning of cylinder 1 will not drive the tally. Such being the case, tally meter 8 may be made to afford summation of gas measured, with correction for variations in pressure. Temperature is the only remaining factor in the measurement of gas for which correction is not afforded in the operation of my apparatus, and the inaccuracy due to temperature variation may be disregarded, or correction for temperature variation may in known manner be computed.

The preferred means for driving tally 8 from cylinder 1 are shown in Figs. I–III of the drawings. Gear wheel 9, the first of the gear wheels which make up the tally 8 is mounted idly upon the axle of cylinder 1 and is arranged adjacent the end of cylinder 1. Gear wheel 9 carries integrally a clutch member, conveniently a concentrically arranged friction drum 91. Cylinder 1 carries a complementary clutch member. This cylinder-borne clutch member takes the form of arms 20 formed of flexible material anchored in the cylinder and extending beyond the head of the cylinder and adapted to be drawn to frictional engagement with the face of drum 91. Electro-magnets 21 are provided, one for each arm, and borne by the cylinder, to swing the arms 20 against spring tension and to bring them into frictional engagement with the face of drum 91. Cooperating with the clutch-closing electro-magnets 21, latches 22 are provided, to hold the arms 20 in clutching engagement with the drum 91, and other electro-magnets 23 are provided which swing the latches 22 against the tension of springs 24 and cause them to release the arms 20 and allow the arms under the inherent tension of the springs to return again to release position. In the course of drum rotation contact of brush 6 with strip 12 closes the circuit which energizes magnets 21, and the ensuing contact of brush 6 with strip 14 closes a circuit which energizes electro-magnets 23. Conveniently there are two arms, arranged in diametrically opposite positions and a corresponding duplication of the associated parts.

The details of structure indicated in the drawings are preferable. The arms 20, otherwise magnetically inert, carry applied blocks 25 of magnetic material (soft iron), suitably placed relatively to magnets 21. The meeting faces of drum 91 and of arms 20 are covered with rubber or equivalent friction-affording material. By such particular provisions the gear wheel 9 may be made delicately responsive to the making of the successive contacts of brush 6 with strips 12 and 14. Should the friction of the parts be found insufficient to hold the tally at rest when the clutch is open, it is within common engineering knowledge to add to the tally a brake adequate to effect that end.

The modification shown in Fig. IV consists merely in this, that in place of gear wheel 9 I here employ a drum 99 serving as a clutch member precisely as drum 91 of the form first described. The drum 99 of Fig. IV, however, instead of being mounted idly on the axle of the cylinder, is mounted integrally on the shaft 81 of the tally 80, which shaft is aligned with the axle of the cylinder. The periphery of drum 99 may be graduated, according to the volume of gas at a standard pressure passed during one revolution, and the parts may conveniently be so proportioned that in one complete revolution of drum 99 one hundred cubic feet of gas are passed; that is, one hundred cubic feet of gas at standard pressure. The rotation of drum 99 indicates the quantity of gas which has flowed, and, it indicates this quantity in cubic feet of gas at standard pressure. That is, the amount of gas which flows is not indicated in volume as it in reality exists and flows under varying pressures, but the equivalent volume—the volume at standard pressure—is indicated. In the apparatus, if the pressure of the gas being measured lowers, the crank arm lowers and cylinder 1 will have to rotate a greater number of turns to cause the drum 99 to move through one revolution. Conversely, if the pressure of the gas increases the crank arm will rise and a lesser number of revolutions of the cylinder 1 are necessary to move the drum through one complete revolution. Regardless of the number of rotations of the cylinder 1, a definite amount of gas at the standard pressure flows for each complete rotation of drum 99 (assuming the temperature of the gas to be constant) and, therefore, the parts may be so proportioned that one complete revolution of the drum is indicative that one hundred cubic feet of gas at the standard pressure have passed. The tally 80, indicating the number of revolutions of drum 99 will under the conditions stated indicate the volume of gas passed, as of standard pressure, and in multiples of one hundred feet.

The cylinder 1 carries concentrically with its axis, but electrically insulated from its mounting, a ring 15 of conducting material. Upon this ring the brush 16 makes contact. By a system of wiring clearly shown in Figs. I, II, and III when the brush 6 makes contact with the strip 12 a circuit is closed from a source of electrical energy 17 through the electro-magnets 21, and by the closing of such circuit the magnets 21 are energized; and when the brush 6 in the continuing rotation of the cylinder 1 makes contact with the strip 14, a circuit from the same source of electrical energy is closed through the electro-magnets 23, and they in turn are energized. When by the energizing of magnets 21 the arms 20 are swung inward and driving contact of the rubber-faced tips of the arms is made upon the rubber-faced drum 91, in consequence of which the gear wheel 9 is caused to rotate in unison with the cylinder 1, the latches 22, impelled by the springs 24, swing to place externally of the arms 20, in the position shown in Fig. III. When thereafter the brush 6 passes from contact with the strip 12 and in consequence the electro-magnets 21 are de-energized, the latches so positioned will continue to hold under tension of spring 24 the arms 20 in engagement upon the face of the drum 91. Thereafter when in further rotation of the cylinder 1 the brush 6 makes contact with the strip 14, the electro-magnets 23 will be energized. The energizing of the electro-magnets 23 will cause the latches 22 to open against the tension of springs 24, and when the latches so open, the spring arms, being free of all restraint, will spread to open position, breaking contact with the drum 91 and freeing the gear wheel 9, so that in the further rotation of the cylinder 1 the gear wheel will not be rotated. As I have said, if necessary, the gear wheel 9 may be provided with a suitable brake.

Initially the strips were characterized as two pairs of strips, identified as 11, 12, and 13, 14. And it has appeared that the essential operation is performed by the two strips 12 and 14, regardless of the companion parallel strips 11 and 13. In these companion parallel strips 11, 13, connected in the manner to be described, provision is made to prevent sparking as the brush 6 makes and breaks contact with the strips 12 and 14. And this is the purpose and value of the companion strips 11 and 13.

These two strips 11 and 13, extending in parallelism with the strips 12 and 14, are arranged in advance of the strips 12 and 14, so that the brush 6 makes contact with them severally immediately before making contact with the strips 12 and 14. In Fig. I of the drawings the interval between strips 11 and 12 and between strips 13 and 14 is for clearness of illustration exaggerated. As a matter of fact the interval will preferably be very slight, only sufficient for the proper intervening insulation. The two strips 11 and 13 are electrically connected through a resistance 18 with the ring 15. Additionally, in the circuit closed by the contact of brush 6, whether with strips 11, 12, 13, or 14, not only is the source of electrical energy 17 included, but an electro-magnet 19 also is included, and this electro-magnet effects the closing against spring tension of a make-and-break device 40 in a shunt circuit of relatively high resistance between the poles of the source 17 of electrical energy.

Referring again to the operation of the instrument as a whole, as the cylinder 1 turns the brush 6 will make contact first with the strip 11. This contact will effect the closing of a circuit which includes the source of energy 17, a circuit which because of the presence of the resistance 18 will carry a feeble flow of current. Current flow, however, will be sufficient to energize the electro-magnet 19 and to effect the closure of the make-and-break device 40. This closure to the make-and-break device involves a deflection of the resilient elements which compose it. The passing of brush 6 from contact with strip 11, although it will immediately effect the breaking of the circuit through resistance 18, will not result in the immediate breaking of the shunt circuit through the make-and-break device 40. This will not be broken until the resistance components of the make-and-break device have broken contact and resumed their normal positions. Meanwhile the brush 6 will have passed to contact with the strip 12, and inasmuch as the contact will have been made while this shunt circuit of high resistance is still unbroken, sparking at the time of the making of contact will be avoided. Furthermore, inasmuch as by the contact of the brush 6 with the strip 12 a circuit will have been completed in which no such resistance as 18 is included, a circuit in which the flow of current is relatively great, and inasmuch as in this circuit also the electro-magnet 19 is included, the shunting circuit will still remain closed. That is to say, before the make-and-break device 40 shall have been opened, the electro-magnet 19 will be re-energized and the tendency of the device to open will immediately be overcome, and the electro-magnet will continue to hold it closed. When thereafter the brush 6 passes from contact with the strip 12, although the circuit which energizes the electro-magnets 21 will immediately be broken, the shunt circuit of high resistance through the make-and-break device 40 will for a brief interval of time continue closed, and this continuance of the closure of the shunt circuit will be effective to prevent sparking between the brush 6 and the strip 12 with which it is at the instant breaking contact.

The strip 13 similarly serves to prevent sparking as the brush 6 makes and breaks contact with the strip 14.

It manifestly is possible to mount the arms 20 and their electro-magnets 21 and 23 upon a member separate from cylinder 1 but rotating in unison with cylinder 1; and, such separation being made, the circuits which operate the electro-magnets may be relay circuits, derived from the circuits made and broken by the rotation of cylinder 1. Cylinder 1 then being mounted adjacent the positive meter, the tally 8 may be situated at a convenient and remote point, so that the attendant is not under the necessity of visiting the positive meter in order to obtain his readings—at least, his readings of tally 8 alone.

I have said that the apparatus of my invention is adapted to aggregate the value of a variable, and I have given as an instance of a variable the movement of a lever in response to the varying pressure of gas flowing in a main. It is possible by known instrumentalities to cause such a lever in its swinging to express a function of a variable. That is to say, the space interval between the strips at any point in the range of movement of brush 6 may for example be the square root or other function of the distance at which the brush stands from a zero point. Thus the variable which the apparatus is caused to summate may be any desired function of another value which other value is itself also a variable.

I claim as my invention:

1. In apparatus for aggregating the value of a variable during a given interval of time, a rotating carrier provided with two electrical contact pieces spaced apart at an interval of varying circumferential extent from point to point, a brush movable longitudinally opposite the face of the said carrier, in response to variation in the value of the variable under measurement and adapted to make electrical contacts with said contact pieces successively, tally mechanism including a clutch member mounted for rotation coaxially with said carrier, a clutch member borne by said carrier adapted to be swung to and from latched engagement with the clutch member of said tally mechanism, means including an electro-magnet and a magnet-energizing circuit closed by the contact of said brush with one of said contact pieces for latching the carrier-borne clutch member in engagement with the clutch member of the tally mechanism, and means including an electro-magnet and a magnet-energizing circuit closed by contact of said brush with the other of said contact pieces for unlatching the carrier-borne clutch member.

2. In apparatus for aggregating the value of a variable during a given interval of time, a rotating cylinder provided with two electrical contact pieces spaced apart circumferentially of the cylinder at an interval of varying extent from point to point, a brush movable longitudinally along the face of the cylinder in response to variation in the value of the variable under measurement and adapted as the cylinder rotates to make successive contacts with the said contact pieces, tally mechanism including a clutch member mounted for rotation, a clutch member borne by said cylinder and movable to engagement with the clutch member of said tally mechanism, a swinging latch for the cylinder-borne clutch member, means including an electro-magnet and a magnet-energizing circuit closed by the contact of said brush with one of said contact pieces for moving the cylinder-borne clutch member to engagement with the clutch member of the tally mechanism, and means including an electro-magnet and a magnet-energizing circuit closed by contact of said brush with the other of said contact pieces for swinging said latch.

3. In apparatus for aggregating the value of a variable during a given interval of time, a rotating cylinder, a tally mechanism including a clutch drum rotatable coaxially with said cylinder, a clutch arm borne by said cylinder and movable against spring tension to a position of engagement with the clutch drum of said tally mechanism, a spring-impelled latch adapted to hold said arm in clutch-engaging position, an electro-magnet borne by said cylinder and adapted to swing said arm to clutch-engaging position, a second electro-magnet borne by said cylinder and adapted to swing said latch to arm-releasing position, a conducting ring borne by said cylinder, a source of electric energy, connection from one pole of said source of electric energy through a brush to said conducting ring, two electric contact pieces spaced apart circumferentially of the cylinder at an interval of varying extent from point to point longitudinally of the cylinder, electrical connections from said electro-magnets to said ring, electrical connections from the said electro-magnets each to one of said contact pieces, a brush movable longitudinally along the face of the cylinder in response to variation in the value of the variable under measurement and adapted as the cylinder rotates to make successive contacts with the said contact pieces, and electrical connection from the opposite pole of said source of energy to said brush.

4. In fluid-measuring apparatus a cylinder mounted to rotate in synchronism with a volumetric meter, two contact pieces borne by the said cylinder and spaced apart circumferentially of the cylinder at an interval of varying extent from point to point, a brush movable longitudinally of the cylinder in response to variation in pressure upon the fluid under measurement and adapted as the cylinder rotates to make successive contacts with the said contact pieces, tally mechanism including a clutch member mounted for rotation coaxially with said cylinder, a clutch member borne by said cylinder and adapted to be swung to engagement with the clutch member of said tally mechanism, means including an electro-magnet and a magnet-energizing circuit closed by contact of said brush with one of said contact pieces for swinging the cylinder-borne clutch member to engagement with the clutch member of the tally mechanism, a latch for the cylinder-borne clutch member, and means including an electro-magnet and a magnet-energizing circuit closed by contact of said brush with the other of said contact pieces for operating said latch.

5. In apparatus for aggregating the value of a variable during successive intervals of time, a rotating member and a rotatable member, a rotation-imparting member borne by the rotating member and movable to and from rotation-imparting engagement with the rotatable member, means for shifting such rotation-imparting member to engagement with said rotatable member, means for retaining such rotation-imparting member in engagement with said rotatable member, and means for operating the shifting and the retaining means in succession and at a greater or less interval of time, according to the value of the variable during successive periods of rotation.

6. In apparatus for aggregating the value of a variable during successive intervals of time, a rotating member provided with two electrical contact pieces spaced apart at an interval of varying circumferential extent from point to point, a brush movable longitudinally opposite the face of said carrier in response to variation in the value of the variable under measurement and adapted to make electrical contacts with said contact pieces successively as the rotating member rotates, tally mechanism including a rotatable member, a clutch member borne by the rotating member first named and adapted to be swung to and from engagement with said rotatable member, means including an electromagnet and a magnet-energizing circuit closed by the contact of the said brush with one of the said contact pieces for swinging said clutch member to engagement with said rotatable member, and means including an electromagnet and a magnet-energizing circuit closed by contact of said brush with the other of said contact pieces for effecting release of the said clutch member from such engagement.

7. In apparatus for aggregating the value of a variable during successive intervals of time, a rotating member provided with two electrical contact pieces spaced apart at intervals of varying circumferential extent from point to point, a brush movable longitudinally opposite the face of said carrier in response to variation in the value of the variable under measurement and adapted to make electrical contacts with said contact pieces successively as the rotating member rotates, tally mechanism including a rotatable member, a resilient clutch member borne by the rotating member first named, standing normally in its released position and adapted to be drawn aside under tension to clutch-engaging position, a spring-backed latch adapted to retain the drawn-aside clutch member in clutch-engaging position, an electro-magnet energized by the contact of said brush with one of said contact pieces and when energized adapted to draw said clutch member to clutch-engaging position, and a second electro-magnet energized by contact of said brush with the other of said contact pieces and adapted when energized to open said latch against spring tension.

In testimony whereof I have hereunto set my hand.

ARCHER E. YOUNG.